March 2, 1948.  F. E. BACHMAN  2,437,219
SHOCK STRUT
Filed Aug. 5, 1944
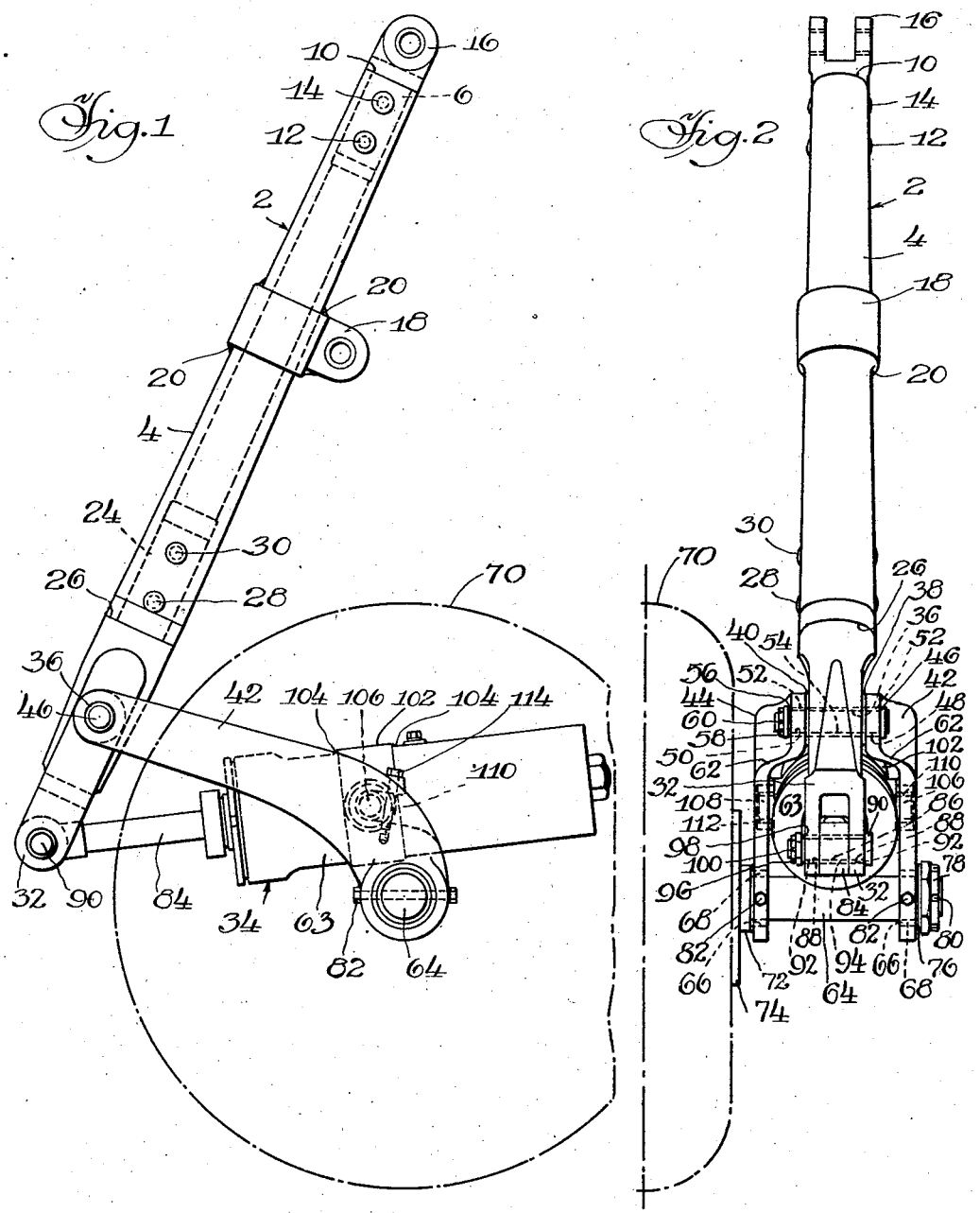
INVENTOR.
Fred E. Bachman
BY
Arvin O. Garner Atty Patented Mar. 2, 1948

2,437,219

UNITED STATES PATENT OFFICE 2,437,219

SHOCK STRUT

Fred E. Bachman, Chicago, Ill., assignor to American Steel Foundries, Chicago, Ill., a corporation of New Jersey Application August 5, 1944, Serial No. 548,155

17 Claims. (Cl. 244—104)

My invention relates to landing gear for aircraft and more particularly to landing gear used between the fuselage or wing and wheel of an airplane.

The general object of my invention is to provide novel landing gear for aircraft in which a shock absorber is employed for damping compression and extension of the gear during landing and taxiing of the airplane.

A specific object of my invention is to provide landing gear between the fuselage and wheel of an airplane comprising a lever arrangement connecting the strut and wheel and having associated therewith a shock absorbing device controlling movement between the strut and the wheel whereby impacts on landing and taxiing of the airplane will be absorbed by the device.

In the drawing,

Figure 1 is a side elevation of the landing gear.

Figure 2 is an end elevation as seen from the left of Figure 1.

Describing my invention in detail, my novel landing gear comprises a strut generally designated 2, having a tubular body 4 receiving at its upper end a cylindrical portion 6 having a shoulder 10 in abutment with the end face of the body 4 and being secured to the body 4 by rivets 12 and 14, said portion being provided with a bracket or hinge 16 for connection of the strut in conventional manner to the fuselage of an airplane (not shown).

Intermediate the ends of the body 4 and surrounding the same is a bracket 18 secured thereto by welding as at 20, said bracket being hinged in conventional manner to the landing gear retracting mechanism (not shown). Received within the lower end of the body 4 is the cylindrical portion 24 having a shoulder 26 in abutment with the end face of the body 4, and secured thereto by rivets 28 and 30, said portion being provided with a bracket or hinge 32 for pivotally connecting the strut 2 to a shock absorbing device generally designated 34, and also provided with an opening 36 extending therethrough between bosses 38 and 40 formed respectively on opposite sides of the portion 24.

The strut adjacent its lower end extends between a pair of levers or torque arms 42 and 44 and is connected thereto by a hinge pin 46 passing through aligned openings 48 and 50 of the levers and the opening 36 in the strut, the openings 48 and 50 being bushed at 52, 52, respectively, and the opening 36 being bushed at 54. The pin 46 has a washer 56 on one end thereof between the lever 44 and a nut 58, said nut urging the inner surfaces of the levers into bearing engagement with the bosses 38 and 40, respectively, and being held in place by a cotter pin 60.

The levers 42 and 44 are offset as at 62, 62 to accommodate the cylinder 63 of the shock absorber therebetween and are curved downwardly for receiving the axle 64 in aligned openings 66, 66 in the ends thereof, said openings being bushed at 68, 68, respectively. The axle 64 is connected at one side thereof to the wheel diagrammatically indicated at 70 in conventional manner, a collar 72 being fixed to the axle between the brake flange 74 and the lever 44 and held in tight engagement therewith by a lock washer 76 and nut 78 on the opposite end of the axle, said washer having abutment with the lever 42 and the nut 78 threaded on the axle. A suitable cotter pin 80 may be provided for preventing unwanted rotation of the nut. The axle is thus fixed against lateral displacement relative to the levers 42 and 44 and rotation of the axle is also prevented by nut and bolt assemblies 82, 82 extending through complementary openings in the axle 64 and the respective ends of the levers 42 and 44.

The shock absorbing device 34 has its plunger 84 pivotally connected to the bracket 32 of the strut 2 by providing the end of the plunger with an opening 86 in alignment with the openings 88, 88 of the strut bracket 32 for receiving a pivot pin 90, said openings 88, 88 being bushed at 92, 92, and said opening 86 being bushed at 94. The pin is held against displacement by a nut 96 fixed thereon by a lock washer 98 and cotter pin 100.

The cylinder 63 of the shock absorber is held in place between the levers 42 and 44 by an annular trunnion band 102 surrounding the same and welded thereto as at 104, 104, said band having bushed trunnions 106 and 108, respectively, received in slots 110 and 112 in the inner surfaces of the levers 42 and 44. A bolt 114 may be inserted in aligned openings formed transversely of the slot in each lever for preventing displacement of the trunnions in the slots.

In the embodiment of the invention now preferred, the shock absorbing device is of the tension type which, while damping relative movement of the plunger 84 and cylinder 63, by fluid metering means (not shown), also is provided with resilient means (not shown) for accommodating but yieldingly resisting movement of the plunger away from the cylinder, and which will, upon relief of the load extend the device, thereby returning the plunger and cylinder to their contracted positions as assumed in flight or necessitated by normal static load of the airplane after the absorption of a shock.

To illustrate the operation of the landing gear, landing of the aircraft will cause impact of the wheel 70 with the ground with resultant movement of the wheel and the associated levers in an upward direction about the pivot 46 of the strut 2. Due to the connection of the brackets 16 and 18 of the strut to the aircraft fuselage and retracting gear mechanism, respectively, the strut will remain fixed and the wheel and levers will move relative thereto in a counterclockwise direction (Figure 1). Accordingly, the pin 90 will form the pivot point for the plunger 84 and the associated cylinder 63 will be moved outwardly of the plunger to absorb the shock of the impact, the cylinder rotating on the trunnions 106 and 108 and moving upwardly with the levers and wheel. On rebound of the wheel, the levers and the shock absorber will be moved with the wheel in an opposite direction to absorb the following impact of the wheel with the ground or to assume a normal static position.

In taxiing of the airplane and when the wheel strikes or rides over a projection, the fuselage of the airplane will tend to follow its original level course with the result that the wheel will be raised and the levers and shock absorber will be moved in a manner similar to that encountered in the landing of the airplane, the movement of the plunger relative to the cylinder damping impact and rebound of the wheel with the ground until the same are restored to their initial relative positions under load. When the wheel falls into a depression, the fuselage of the airplane will also tend to follow its original course and the lowering of the wheel into the depression, due to the action of the shock absorber, will cause the levers and shock absorber to be moved in a clockwise direction (Figure 1) and then in an opposite direction upon raising of the wheel by the edge of the depression, both directional movements effecting a dampening action by the relative contraction and expansion of the shock absorber until the resilient means thereof recovers its normal static load condition.

It may be noted that, by mounting the shock absorber device in the manner described above, the device will obviously respond to horizontal loads as well as vertical loads and the more frequent loads therebetween which are resultants of the vertical and horizontal or drag loads.

Further, it is apparent that an additional advantage of my novel landing gear is the caster effect, in which the wheel is trailing by virtue of the lever connection to the strut. This trailing action tends to maintain the wheels in proper position in relation to the direction of the airplane making it possible to reduce strength of members resisting instability such as may be encountered by aircraft landing gear with less caster effect in negotiating rough terrain with consequent increased tendency to revolve the wheel about the center line of the strut.

An additional advantage is the manner in which the shock absorber device is mounted in this levered arrangement, whereby it is subject to axial loads only, regardless of the forces acting on the wheel, making for economy in construction of the shock absorbing device.

A further advantage is the ease with which replacement of the shock absorbing device can be made, that is, without removal of the wheel or main strut.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a landing gear for aircraft, the combination of a strut having one end adapted for connection to the aircraft, a wheel, a pair of spaced parallel levers extending between said strut and said wheel and pivotally connected to said strut adjacent the other end thereof and to said wheel, a shock absorber device comprising two relatively movable members and means for yieldingly resisting movement therebetween, one of said members being positioned between said levers and the other of said members being pivotally connected to said second-mentioned end of said strut below the pivotal connection of said levers to said strut, and trunnion means for pivotally connecting said one member between and intermediate the ends of said levers to said levers.

2. In a landing gear for aircraft, the combination of a strut adapted for connection to the aircraft, a wheel, a pair of spaced parallel levers having opposite ends thereof pivotally connected to said strut and said wheel, said levers providing trunnion bearings between the opposite ends thereof, a shock absorber device between said levers and pivotally connected at one end thereof to said strut, and a trunnion band surrounding said device and having trunnions received in said trunnion bearings.

3. In a landing gear for aircraft, the combination of a strut adapted for connection to the aircraft, an axle with a wheel mounted thereon, a pair of spaced substantially parallel torque arms pivotally connected at opposite ends thereof to said strut and said axle, and an extensible shock absorbing device pivotally connected to said strut and supported above the horizontal center line of said wheel in trunnions in said torque arms, said device being arranged with respect to said arms and strut that compression of said landing gear effects the extension of said device.

4. In a landing gear for aircraft, the combination of a strut adapted for connection to the aircraft, a wheel, a lever pivotally connected at opposite ends thereof to said strut and said wheel, a shock absorbing device pivotally connected to said lever and said strut, the pivotal connections of said device and said lever to said strut being disposed in the plane of said strut and so arranged as to cause relative pivotal movement of the device and said lever in opposite directions about their pivotal connection to each other during extension and compression of the gear.

5. In a landing gear for aircraft, the combination of a strut adapted for connection to the aircraft, an axle with a wheel mounted thereon, a pair of substantially parallel torque arms on one side of said wheel and pivotally connected at opposite ends thereof to said axle and to said strut, and a tension shock absorber device between said arms and pivotally connected thereto intermediate opposite ends thereof and to said strut, said device being arranged with respect to said arms and strut to cause extension of said landing gear upon contraction of said device.

6. In a landing gear for aircraft, the combination of a strut adapted for connection to the aircraft, a wheel, a pair of substantially parallel levers extending between said strut and said wheel, each of said levers having one end thereof pivotally connected to said strut above the lower end thereof and the other end pivotally connected to said wheel at the axis thereof, and a shock absorber device between said levers and pivotally connected thereto intermediate opposite ends thereof and to said strut at the lower end thereof.

7. In a landing gear for aircraft, the combination of a strut adapted for connection to the aircraft, a wheel, a lever pivotally connected to said strut and said wheel, and a shock absorber device comprising two relatively movable members and means for yieldingly resisting movement therebetween, one of said members being pivotally connected to said lever between the ends thereof and the other of said members being pivotally connected to said strut below the pivotal connection of said lever to said strut.

8. In a landing gear for aircraft, the combination of a strut adapted for connection to the aircraft, a wheel, a pair of torque arms pivotally connected to said strut and said wheel, a shock absorbing device comprising two relatively movable members and means for yieldingly resisting movement therebetween, one of said members being pivotally connected to said strut, and trunnion means for pivotally connecting the other of said members to said arms intermediate the pivotal connections thereof to said strut and wheel.

9. In a landing gear for aircraft, the combination of a strut adapted for connection to the aircraft, a wheel, a pair of spaced levers pivotally connected at opposite ends thereof to said strut and said wheel, a shock absorbing device between said levers, trunnion means pivotally connecting said device to said levers intermediate the pivotal connections thereof to said strut and wheel, and a pivotal connection between said device and said strut at the lower end of the latter.

10. In a landing gear for aircraft, the combination of a strut adapted for connection to the aircraft, an axle with a wheel mounted thereon, a pair of spaced torque arms pivotally connected to said strut and said axle at one side of said wheel, and an extensible shock absorbing device pivotally connected to said strut at the lower end thereof and supported above the horizontal center line of said wheel in trunnions in said torque arms intermediate the pivotal connections thereof to said strut and said axle.

11. In a landing gear for aircraft, the combination of a wheel and axle assembly, a strut adapted for connection to the aircraft, a pair of spaced parallel levers pivotally connected at opposite ends thereof to said assembly and said strut, and a shock absorbing device between said levers and having a pivotal connection at one end thereof to said strut beneath the connection thereof to said levers, and trunnion means pivotally connecting said device to said levers, the pivotal connections of said device and levers to each other and to said strut being arranged to cause extension of said device upon compression of said gear.

12. In a landing gear for aircraft, the combination of a strut adapted for connection to the aircraft, a wheel, a pair of spaced levers having opposite ends pivotally connected to said strut and said wheel, a shock absorber device pivotally connected between said levers adjacent their connections to said wheel, and a pivotal connection between said shock absorber and said strut the pivotal connections of said device and levers to each other and to said strut being arranged to cause extension of said device upon compression of said gear.

13. In a landing gear for aircraft, the combination of a downwardly extending strut having the upper end adapted for connection to the aircraft, an axle with a wheel mounted thereon, a pair of substantially parallel levers pivotally connected at respective corresponding ends thereof to said strut adjacent the lower end thereof and to said axle, a shock absorber extending transversely of said levers and comprising two relatively movable members and means for yieldingly resisting movement therebetween, one of said members being pivotally connected to the lower end of said strut below the pivotal connection of said levers to said strut and the other member being disposed between said levers and pivotally connected thereto between the opposite ends thereof and adjacent the pivotal connection of said levers to said axle.

14. In a landing gear for aircraft, the combination of a strut having its upper end adapted for connection to the aircraft, a wheel, a pair of levers pivotally connected to said strut adjacent the lower end thereof and to said wheel at the axis thereof, and a shock absorber device pivotally connected to said strut at the lower end thereof below the pivotal connections of said levers to said strut and to said levers between the ends thereof.

15. In a landing gear for aircraft, the combination of a strut adapted for connection to the aircraft, a wheel, a pair of levers pivotally connected to said wheel and to said strut, and a shock absorber device between said levers and pivotally connected thereto and to said strut at the extremity thereof and below the pivotal connections of said levers to said strut.

16. In a landing gear for aircraft, the combination of a downwardly extending strut having the upper end adapted for connection to the aircraft, an axle having a wheel mounted thereon, a pair of substantially parallel levers having trunnion means between opposite ends thereof and having respective corresponding ends connected to said strut adjacent the lower end thereof and to said axle, a shock absorber device between said levers intermediate opposite ends thereof and extending transversely of said levers and being pivotally connected at one end thereof to the lower end of said strut and adjacent the other end thereof to said trunnion means whereby compression of said gear causes extension of said device.

17. In a landing gear for aircraft, the combination of a downwardly extending strut adapted for connection to the aircraft, an axle having a wheel mounted thereon, a lever having the opposite ends thereof pivotally connected respectively to said strut adjacent the lower end thereof and to said axle, a shock absorber device extending transversely of said lever and pivotally connected thereto intermediate opposite ends thereof and pivotally connected at one end thereof to the lower end of said strut, the pivotal connections of said device and said lever to said strut being so arranged as to cause relative pivotal movement of the device and said lever in opposite directions about their pivotal connections to each other to effect extension of said device during compression of said gear.

FRED E. BACHMAN.

REFERENCES CITED

The following references are of record in the file of this patent:

UNITED STATES PATENTS

| Number | Name | Date |
|---|---|---|
| 1,084,777 | Wyckoff | Jan. 20, 1914 |
| 1,158,594 | Vintila | Nov. 2, 1915 |
| 1,384,784 | Shankland | July 19, 1921 |
| 1,816,143 | Cordy | July 28, 1931 |
| 2,026,057 | Pearse | Dec. 31, 1935 |
| 2,174,315 | Dowty | Sept. 26, 1939 |
| 2,319,446 | Dowty | May 18, 1943 |
| 2,363,308 | Focht | Nov. 21, 1944 |

FOREIGN PATENTS

| Number | Country | Date |
|---|---|---|
| 46,798 | Sweden | Jan. 17, 1918 |
| 527,111 | Great Britain | Oct. 2, 1940 |
| 542,817 | Great Britain | Jan. 28, 1942 |